United States Patent
Wei

(10) Patent No.: US 11,971,303 B2
(45) Date of Patent: Apr. 30, 2024

(54) QUADRILATERAL COMMON-PATH TIME-MODULATED INTERFEROMETRIC SPECTRAL IMAGING DEVICE AND METHOD

(71) Applicant: WUHAN UNIVERSITY, Hubei (CN)

(72) Inventor: Ruyi Wei, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/320,172

(22) Filed: May 18, 2023

(65) Prior Publication Data
US 2023/0408337 A1 Dec. 21, 2023

(30) Foreign Application Priority Data
Jun. 13, 2022 (CN) .......................... 202210659168.8

(51) Int. Cl.
*G01J 3/453* (2006.01)
*G01J 3/02* (2006.01)
*G01J 3/06* (2006.01)
*G01J 3/28* (2006.01)

(52) U.S. Cl.
CPC .......... *G01J 3/4535* (2013.01); *G01J 3/0208* (2013.01); *G01J 3/021* (2013.01); *G01J 3/06* (2013.01); *G01J 3/2823* (2013.01); *G01J 2003/062* (2013.01); *G01J 2003/064* (2013.01); *G01J 2003/4538* (2013.01)

(58) Field of Classification Search
CPC ........ G01J 3/4535; G01J 3/0208; G01J 3/021; G01J 3/06; G01J 3/2823; G01J 2003/062; G01J 2003/064; G01J 2003/4538
See application file for complete search history.

(56) References Cited

U.S. PATENT DOCUMENTS

| | | | | |
|---|---|---|---|---|
| 6,442,411 B1* | 8/2002 | Guthermann | .......... | A61B 5/201 600/336 |
| 2014/0354991 A1* | 12/2014 | Li | .......... | G02B 27/14 356/367 |
| 2019/0369006 A1* | 12/2019 | Jiang | .......... | G02B 5/3083 |
| 2020/0158568 A1* | 5/2020 | Kasim | .......... | G01J 3/0208 |

FOREIGN PATENT DOCUMENTS

| | | | | |
|---|---|---|---|---|
| CN | 102759402 | | 10/2012 | |
| CN | 105318969 | | 2/2016 | |
| CN | 106546335 | | 3/2017 | |
| CN | 106918392 | | 7/2017 | |
| CN | 108613742 | | 10/2018 | |
| CN | 111562000 | | 8/2020 | |
| CN | 111562001 B | * | 4/2021 | .......... G01J 3/0224 |

* cited by examiner

*Primary Examiner* — Hina F Ayub
(74) *Attorney, Agent, or Firm* — JCIP GLOBAL INC.

(57) ABSTRACT

The present invention belongs to the field of optical technology, disclosing a quadrilateral common-path time-modulated interferometric spectral imaging device and method. The present invention sets up a moving mirror scanning mechanism in a quadrilateral common path interferometer for generating optical path differences that vary with time, so that the quadrilateral common-path time-modulated interferometric spectral imaging device operates in the staring observation mode. The invention can make the quadrilateral common-path time-modulated interferometric spectral imaging device not only retain the advantages of common optical path spectroscopic technology, but also obtain high spectral resolution.

9 Claims, 2 Drawing Sheets

QUADRILATERAL COMMON-PATH TIME-MODULATED INTERFEROMETRIC SPECTRAL IMAGING DEVICE AND METHOD

CROSS-REFERENCE TO RELATED APPLICATION

This application claims the priority benefit of China application serial no. 202210659168.8, filed on Jun. 13, 2022. The entirety of the above-mentioned patent application is hereby incorporated by reference herein and made a part of this specification.

BACKGROUND

Technical Field

The present invention belongs to the field of optical technology, and more specifically, relates to a quadrilateral common-path time-modulated interferometric spectral imaging device and method.

Description of Related Art

Interferometric spectroscopy (imaging) technology is based on the principle of Interferometric Spectroscopy, which is an important type of technology in optical detection technology and spectral imaging technology. There are three main types of Interferometric spectroscopy (imaging) techniques that have emerged: one is time-modulated (dynamic) based on the Michelson interferometer; One is the spatial modulation type (static) based on the transverse shear interferometer; The other is also a space-time joint modulation type (static) based on a transverse shear interferometer. Based on these techniques, a variety of Interferometric spectroscopy (imaging) instruments have emerged, but they often have their own shortcomings. The time-modulated Interferometric spectroscopy (imaging) instrument produces a changing optical path difference through the motion of the moving mirror in the Michelson interferometer, and performs Fourier transform on the interference fringes at different optical path differences obtained to obtain spectral information. This technology has high luminous flux and high signal-to-noise ratio, especially the spectral resolution can rely on the linear movement of the moving mirror to produce a large optical path difference and achieve high performance, which can far exceed any other kind of spectral detection technology at present. But because the speed and attitude control in the moving mirror movement have high requirements for the calibration accuracy of the interferometer, so the opto-mechanical stability is poor, and it is difficult to be applied to motion platforms such as vehicle-mounted, airborne, shipborne, mobile robot, spaceborne and other modes. Time-modulated Interferometric spectroscopy (imaging) instruments all operate in staring observation mode, that is, the scanning integration of the internal moving mirror of the instrument is required to obtain the interference pattern at different moments. The spatial modulation type relies on the transverse shear interferometer of the common-path, which has high stability, good real-time performance and simple structure, but the spectral resolution is limited by the number and size of the detector element and the resolution is low. The structure of space-time joint modulation is similar to that of space modulation, with high stability, and the detection sensitivity can be higher than that of space-modulated interferometer and dispersive spectrometer, but the requirement of stability of the platform is very high, and the spectral resolution is similar to that of spatial modulation but lower.

The existing spectral imaging device based on quadrilateral common-path interferometer adopts common-path spectroscopic technology, which is "static" due to the absence of moving mirror in the interferometer, which relies on the scanning field movement of the platform to obtain different optical path differences of the same target under different field of view. However, the lower resolution limits the application of this interferometric spectrometer. How to retain the advantages of the existing quadrilateral common-path interferometer in the common-path and obtain high spectral resolution is a problem that needs to be solved in this field.

SUMMARY

The present invention provides a quadrilateral common-path time-modulated interferometric spectral imaging device and method, to solve the problem that the quadrilateral common-path interferometric spectral imaging device in the prior art can not retain the advantages of common-path spectroscopic technology, but also obtain high spectral resolution.

The present invention provides a quadrilateral common-path time-modulated interferometric spectral imaging device, including: a quadrilateral common-path interferometer, the quadrilateral common-path interferometer is an asymmetric structure, the quadrilateral common-path interferometer is provided with a moving mirror scanning mechanism for generating a time-varying optical path difference, the quadrilateral common-path time-modulated interferometric spectral imaging device works in staring observation mode.

Preferably, the quadrilateral common-path interferometer includes a semi-transparent semi-reflective beam splitter, a first plane mirror, a second plane mirror, a third plane mirror, a first optical path adjustment module and a second optical path adjustment module; The first optical path adjustment module and the second optical path adjustment module are combined to constitute the moving mirror scanning mechanism, the first optical path adjustment module and the second optical path adjustment module are placed in the two arms of the interferometer, and the two arms respectively produce the first optical path and the second optical path, respectively, the first optical path and the second optical path combination form a periodically varying optical path difference near zero optical path difference.

The target light is incident to the quadrilateral common-path interferometer, which is divided into a first transmitted beam and a first reflected beam after passing through the semi-transparent semi-reflective beam splitter; The first transmitted beam returns to the semi-translucent semi-reflective beam splitter again after passing through the first plane mirror, the second plane mirror, the third plane mirror and the first optical path adjustment module, and is divided into a second transmitted beam and a second reflected beam by the semi-transparent semi-reflective beam splitter; The first reflected beam returns to the semi-transparent semi-reflective beam splitter again after passing through the first plane mirror, the second plane mirror, the third plane mirror, and the second optical path adjustment module, and is divided into a third transmitted beam and a third reflected beam by the semi-transparent semi-reflective beam splitter; The second reflected beam and the third transmitted beam exit in the first direction, and the second transmitted beam and the third reflected beam exit in the second direction.

Preferably, one of the first optical path adjustment module and the second optical path adjustment module is a moving mirror, and the other optical path adjustment module is a fixed mirror; The optical path adjustment module as a moving mirror includes an optical path adjustment device and a motor, the optical path adjustment device moves under the drive of the motor; The path adjustment module as the fixed mirror includes only the optical path adjustment device.

Preferably, the optical path adjustment device in the optical path adjustment module as a moving mirror includes a first prism and a second prism, and the optical path adjustment device in the optical path adjustment module as a fixed mirror includes a third prism and a fourth prism; the exit surface after the beam passing through any one of the first prism, the second prism, the third prism, and the fourth prism is parallel to the incident surface; the first prism and the second prism rotate under the drive of the motor, and the rotation axis of the motor is perpendicular to the propagation direction of the beam; The attitudes of the third prism and the fourth prism have angles tilt relative to the perpendicular incident surface of the beam, which is used to compensate for the zero dispersion effect and increase the zero-crossing optical path difference position.

Preferably, the first optical path adjustment module and the second optical path adjustment module are moving mirrors, the first optical path adjustment module comprises a first optical path adjustment device and a first motor, the second optical path adjustment module includes a second optical path adjustment device and a second motor; The first optical path adjustment device moves under the drive of the first motor, and the second optical path adjustment device moves under the drive of the second motor.

Preferably, the motion mode of the moving module is one of the rotation, swinging, linear motion.

Preferably, the quadrilateral common-path time-modulated interferometric spectral imaging device further comprises: a convergence module, a detection acquisition module and a signal processing module; The target surface of the detection acquisition module is located on the back focal plane of the convergence module, and the signal processing module is connected with the detection acquisition module; The convergence module is configured to form interference from the beam exited by the quadrilateral common-path interferometer, and image it onto the detection acquisition module; The detection acquisition module is configured to sample and collect the interference fringe signal at different moments, and convert it into an electrical signal to obtain detection information; The signal processing module is configured for spectral restoration according to the detection information to obtain spectral information.

Preferably, the quadrilateral common-path time-modulated interferometric spectral imaging device further includes: a pre-module; The pre-module includes a converging lens, an aperture and a collimating lens disposed sequentially along the optical path; The target light passes through the pre-module and becomes a parallel light and is incident to the quadrilateral common-path interferometer.

On the other hand, the present invention provides a quadrilateral common-path time-modulated interferometric spectral imaging method, using the above-mentioned quadrilateral common-path time-modulated interferometric spectral imaging device to achieve, by providing a moving mirror scanning mechanism for generating time-varying optical path differences in the quadrilateral common-path interferometer, so that the quadrilateral common-path time-modulated interferometric spectral imaging device works in staring observation mode.

Preferably, the quadrilateral common-path time-modulated interferometric spectral imaging method comprises the following steps:

Step 1: The target light becomes a parallel light after passing through the pre-module and is incident to the quadrilateral common-path interferometer;

Step 2, the parallel light is divided into a first transmitted beam and a first reflected beam by a semi-transparent semi-reflective beam splitter; The first transmitted beam returns to the semi-transparent semi-reflective beam splitter again after passing through the first plane mirror, the second plane mirror, the third plane mirror and the first optical path adjustment module, and is divided into a second transmitted beam and a second reflected beam by the semi-transparent semi-reflective beam splitter; The first reflected beam passes through the first plane mirror, the second plane mirror, the third plane mirror and the second optical path adjustment module and returns again to the semi-translucent semi-reflective beam splitter, and is divided into a third transmitted beam and a third reflected beam by the semi-transparent semi-reflective beam splitter; the second reflected beam and the third transmitted beam are emitted in the first direction, and the second transmitted beam and the third reflected beam are emitted in the second direction;

Step 3: The beam exited by the quadrilateral common-path interferometer is formed into interference through the convergence module, and imaged to the detection acquisition module;

Step 4, through the detection acquisition module to sample and collect interference fringe signals at different moments, and convert into electrical signals to obtain detection information;

Step 5: Spectral restoration is carried out according to the detection information through the signal processing module to obtain spectral information.

One or more technical solutions provided in the present invention, having at least the following technical effects or advantages:

The quadrilateral common-path time-modulated interferometric spectral imaging device provided by the present invention comprises a quadrilateral common-path interferometer, the quadrilateral common-path interferometer is an asymmetric structure and is provided with a moving mirror scanning mechanism for generating a time-varying optical path difference, and the quadrilateral common-path time-modulated interferometric spectral imaging device works in staring observation mode. The present invention adopts a common-path spectrometer based on a quadrilateral common-path interferometer common-path spectroscopic technology, due to the characteristics of high stability based on common-path technology, and because the interferometer is provided with a moving mirror scanning mechanism, the movement of the moving mirror scanning mechanism can produce a time-varying optical path difference, and then high spectral resolution can be achieved.

The present invention proposes a new interference spectroscopic mode and time-modulated interferometric spectroscopy (imaging) technology, combining the common-path with the time-modulated interferometric spectroscopy (imaging) technique, which is of great significance. The present invention changes the basic configuration of the traditional time-modulated interferometric spectroscopy (imaging) instrument, so that the time-modulated interferometric spectroscopy (imaging) instrument can not only overcome the problem of poor stability, but also have the advantages of high stability and strong anti-interference ability, while maintaining the original advantages of high throughput, high signal-to-noise ratio, and low stray light.

Traditional common-path interferometer because the optical path of the two arms of the interferometer is always fixed or the same, resulting in the optical path difference between the two arms is fixed, so that the time-modulated working mode cannot be realized. The present invention by setting at least one "dynamic" optical path adjustment module as a moving mirror in the common-path interferometer, through the motion of the moving mirror at different moments to produce different optical path differences, and then obtain a time integral interferogram, thereby reflecting the spectral information of the target, the present invention can realize the working mode of the time-modulated type interferometric spectrometer (imaging), the working mode of the present invention breaks through the previous common-path interferometer on the spectral information acquisition restriction ability.

In addition, the traditional time-modulated interferometric spectroscopy (imaging) instrument obtains interferograms at different times due to the changing optical path difference, and the two arms of its core interferometer components are relatively independent, that is, the interferometer of the non-common-path. Non-common-path and common-path two interferometers are different types of interferometers. The present invention adopts the core components of common-path interferometer, breaks through the limitations of traditional non-common-path interferometer, and realizes time-modulated interferometric spectroscopy (imaging) technology based on common-path interferometer.

Where, 1—semi-transparent semi-reflective beam splitter, 2—first plane mirror, 3—second plane mirror, 4—third plane mirror, 5—third prism, 6—fourth prism, 7—first prism, 8—second prism, 9—incident beam, 10—exit beam in the first direction, 11—exit beam in the second direction, 12—pre-module, 13—mirror, 14—motor, 15—first convergence module, 16—second converging module, 17—first detection acquisition module, 18—the second detection acquisition module, 19—signal processing module;
  1201—converging lens, 1202—optical stop, 1203—collimating lens.

DESCRIPTION OF THE EMBODIMENTS

In order to better understand the above technical solutions, the above technical solutions will be explained in detail in combination with the drawings attached to the specification and specific embodiments.

Example 1

Example 1 provides a quadrilateral common-path time-modulated interferometric spectral imaging device, including: a quadrilateral common-path interferometer. The quadrilateral common-path interferometer is an asymmetric structure. The quadrilateral common-path interferometer is provided with a moving mirror scanning mechanism for generating a time-varying optical path difference. The quadrilateral common-path time-modulated interferometric spectral imaging device works in staring observation mode.

Figure 1:
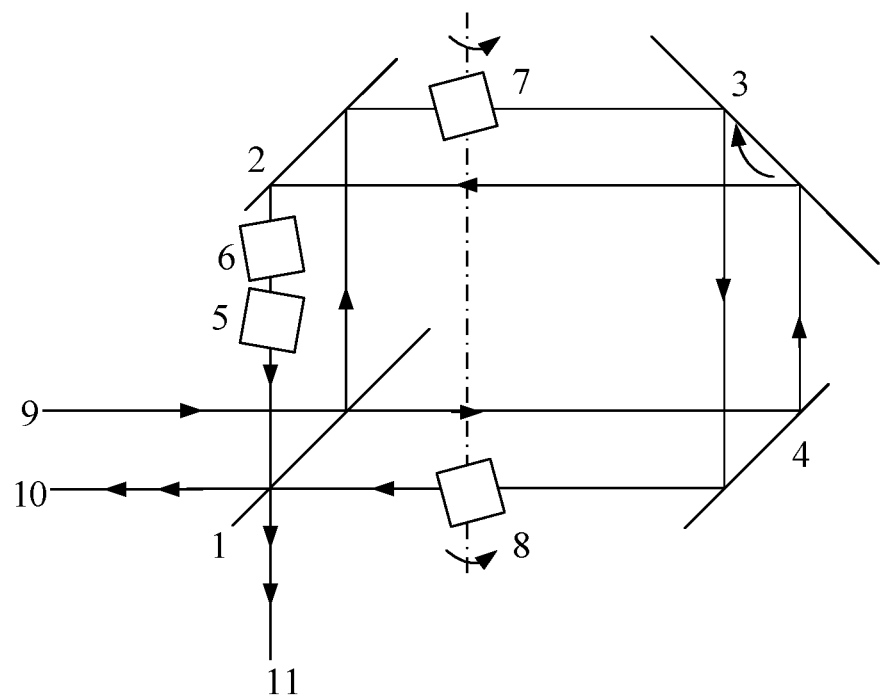
FIG. 1 is an optical schematic diagram of a quadrilateral common-path time-modulated interferometric spectral imaging device provided by an embodiment of the present invention to achieve interference spectroscopy.

Wherein, referring to FIG. 1, the quadrilateral common-path interferometer comprises a semi-transparent semi-reflective beam splitter 1, a first plane mirror 2, a second plane mirror 3, a third plane mirror 4, a first optical path adjustment module and a second optical path adjustment module; The first optical path adjustment module and the second optical path adjustment module are combined to constitute the moving mirror scanning mechanism. The first optical path adjustment module and the second optical path adjustment module are placed in the two arms of the interferometer, and the two arms respectively produce the first optical path and the second optical path, respectively. The combination of first optical path and the second optical path forms a periodically varying optical path difference near zero optical path difference.

The target light (i.e., incident beam 9) is incident to the quadrilateral common-path interferometer, which is divided into a first transmitted beam and a first reflected beam after passes through the semi-transparent semi-reflective beam splitter 1. The first transmitted beam passes through the first plane mirror 2, the second plane mirror 3, the third plane mirror 4 and the first optical path adjustment module and returns again to the semi-transparent semi-reflective beam splitter 1, and is divided into a second transmitted beam and a second reflected beam by the semi-transparent semi-reflective beam splitter 1. The first reflected beam returns to the semi-translucent semi-reflective beam splitter 1 again after passing through the first plane mirror 2, the second plane mirror 3, the third plane mirror 4 and the second optical path adjustment module, and is divided into a third transmitted beam and a third reflected beam by the semi-transparent semi-reflective beam splitter 1. The second reflected beam and the third transmitted beam exit in the first direction (i.e., forming an exit beam 10 in the first direction), the second transmitted beam and the third reflected beam exit in the second direction (i.e., forming an exit beam 11 in the second direction).

The quadrilateral common-path interferometer in the present invention is an asymmetric structure, and a plurality of plane mirrors in the interferometer (including the first plane mirror 2, the second plane mirror 3, the third plane mirror 4) are not strictly symmetrical with respect to the axis of the beam plane, but each one of the faces or two faces or even three faces produces a certain translation, the amount of translation depends on the diameter of the beam and the structural physical space size required for the design. The two outgoing interference beams of the interferometer return all the way to the direction of the light source and no longer coincide with the original incident beam. The other path is perpendicular to the direction of the incident light source. The present invention adjusts the spatial position of a plurality of planar mirrors in the quadrilateral interferometer such that the beam finally returning to the direction of incidence of the light source through the semi-transparent semi-reflective beam splitter 1 (i.e., the exit beam 10 in the first direction) no longer coincides with the incident beam 9, but is spatially parallel to separation, thereby facilitating the change of the optical path by changing the medium or path, and at the same time doubling the energy utilization rate. The beam incident on the four-deformation interferometer is separated by the semi-transparent semi-reflective beam splitter 1 and passes through the same interference device in the interferometer, thereby constituting a common-path interferometer.

Two configurations of the path adjustment components are provided below.

(1) One of the first optical path adjustment module and the second optical path adjustment module is a moving mirror, and the other optical path adjustment module is a fixed mirror.

The optical path adjustment module as a moving mirror includes an optical path adjustment device and a motor, the optical path adjustment device moves under the drive of the motor. The path adjustment module as the fixed mirror includes only the optical path adjustment device.

The following is an example of the optical path adjustment device as a prism and the movement mode of the moving mirror as rotation.

Figure 2:
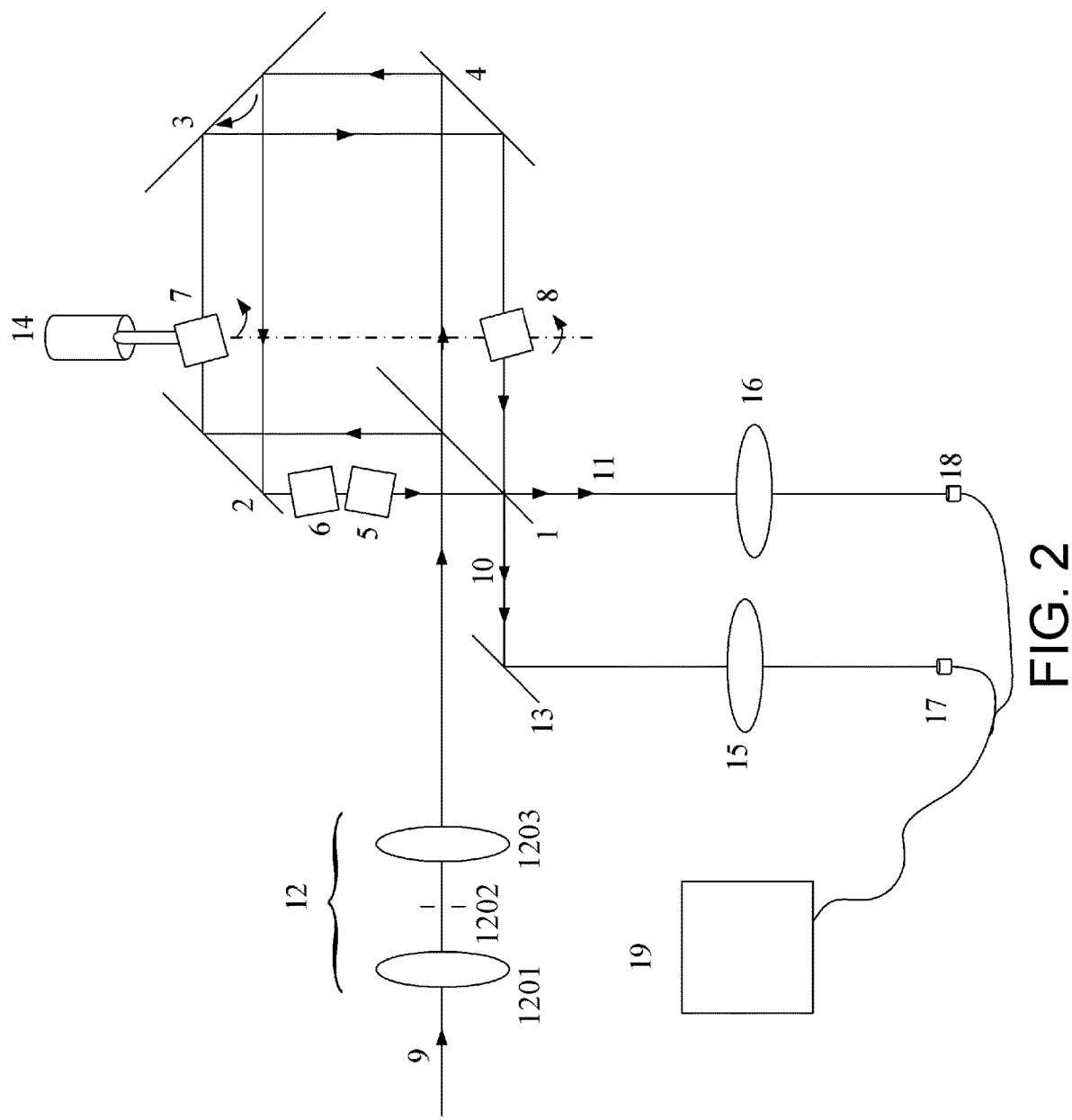
FIG. 2 is a schematic diagram of a quadrilateral common-optical path time-modulated interferometric imaging spectrometer provided by an embodiment of the present invention.

Referring to FIGS. 1, FIG. 2, the path adjustment device in the optical path adjustment module as a moving mirror includes a first prism 7 and a second prism 8, a path adjustment device in the optical path adjustment module as a fixed mirror includes a third prism 5 and a fourth prism 6, and a plurality of prisms in the interferometer are used to change the optical path.

The exit surface after the beam passing through any prism of the first prism 7, the second prism 8, the third prism 5, and the fourth prism 6 is parallel to the incident surface, that is, the incident surface of each prism is strictly parallel to the exit surface (within <5" is more appropriate), so that the incident surface after the beam passing through the prism is strictly parallel to the exit surface. The first prism 7 and the second prism 8 rotate under the drive of the motor 14, and the rotation axis of the motor 14 is perpendicular to the direction of propagation of the beam. Specifically, the pair of prisms 7 and the second prism 8 are fixed together and rotate, and the axis of rotation is perpendicular to the propagation direction of the beam, so as to keep the orientation of the exit beam consistent with the incident light. When there is a certain shaking of the rotating axis, the first prism 7 and the second prism 8 will have a certain deviation relative to the ideal attitude, but the second prism 8 will compensate for the beam offset caused by the first prism 7, so that the propagation direction of the exit beam is not deflected, that is, the self-compensation of the attitude error caused by the shaft shaking of the beam when the moving mirror rotates, and the immunity of the interferometer shaking error and the permanent collimation of the two interferometric lights are realized. The attitude of the third prism 5 and the fourth prism 6 is fixed, and the attitude has a certain angle tilt relative to the vertical incidence surface of the beam, which is used to compensate for the zero dispersion effect, keep the orientation of the exit beam consistent with the incident light, and increase the zero-crossing optical path difference position (double the vertical incidence).

The changed optical path is generated by the rotation of the first prism 7 and the second prism 8, and fixed optical path combination of the third prism 5 and the fourth prism 6 forms a periodically varying optical path difference near the zero optical path difference from −L to 0 and then from 0 to +L of the optical path difference changes, passing through the position of zero optical path difference, where L is the maximum optical path difference. Thus, the interferogram of different optical path differences corresponding to different times can be obtained. Then, the interferogram is obtained by spectral restoration algorithms such as Fourier transform. This is the time-modulated interferometric spectroscopy (imaging) mode of operation.

The two pair prisms of third prism 5 and the fourth prism 6 and the first prism 7 and the second prism 8 are respectively placed in the two arms of the interferometer (the arm where the first transmitted beam formed by semi-transparent semi-reflective beam splitter 1 is located and the arm where the first reflected beam formed by semi-transparent semi-reflective beam splitter 1 is located). The pair prism of the third prism 5 and the fourth prism 6 are located in the static arm of the interferometer, and the pair prism of the first prism 7 and the second prism 8 are located in the moving arm of the interferometer. These two pairs of prisms not only eliminate the dispersion of the zero optical path difference position, but also make the two beams of lights that produce interference always coincide spatially, so as to achieve a high interference fringe toning system.

Further, the interferometer shown in FIG. 1 is a hollow structure, and the semi-transparent semi-reflective beam splitter 1 may be a beam splitter in the form of a cube or a beam splitter in the form of a plate. Some of the instruments are solid structures, which can be realized by the prism plated semi-transparent and semi-reverse beam splitting film that composes the interferometer. The function of multiple planar mirrors is to reflect the beam and adjust the distribution of the beam in space, and a single planar mirror can also be replaced by a combination of multiple planar mirrors. Prism pairs can also be replaced by a single prism. In summary, the function of a plurality of prisms in the present invention is to produce a time-varying optical path difference. The prism structure described above may also be replaced by other forms, for example, other prisms or parallel mirror pairs and combinations thereof may be used. The shaft of the motor 14 may be periodically rotating, or it may be periodically swinging and other modes of motion.

(2) The first optical path adjustment module and the second optical path adjustment module are moving mirrors.

The difference with (1) is that the first optical path adjustment module comprises a first optical path adjustment device and a first motor, and the second optical path adjustment module includes a second optical path adjustment device and a second motor. The first optical path adjustment device moves under the drive of the first motor, and the second optical path adjustment device moves under the drive of the second motor. The movement mode of the moving mirror can be one of the rotation, swing, and linear motion.

For example, both moving mirrors adopt a rotation mode, and the first optical path adjustment device and the second optical path adjustment device can have different rotation directions and rotation speeds. The two moving mirrors work together to produce a time-varying optical path difference.

A quadrilateral common-path time-modulated interferometric spectral imaging device provided by the present invention, see FIG. 1 and FIG. 2, in addition to the core portion described above (improved quadrilateral common-path interferometer), may also include: a pre-module 12, a convergence module (including a first convergence module 15 and a second convergence module 16), a detection acquisition module (including a first detection acquisition module 17 and a second detection acquisition module 18) and a signal processing module 19.

After passing through the pre-module 12, the target light becomes a parallel light and is incident to the quadrilateral common-path interferometer. The target surface of the detection acquisition module is located on the back focal plane of the convergence module, and the signal processing module 19 is connected to the detection acquisition module. The convergence module is configured to form interference from the beam exited by the quadrilateral common-path interferometer, and image it onto the detection acquisition module. The detection acquisition module is configured to sample and collect the interference fringe signal at different moments, and convert it into an electrical signal to obtain detection information. The signal processing module 19 is configured for spectral restoration according to the detection information to obtain spectral information.

For example, referring to FIG. 2, the incident beam 9 enters the interferometer after passing through the pre-module 12, and is divided into a first transmitted beam and a first reflected beam by the semi-transparent semi-reflective beam splitter 1. After passing through the third plane mirror 4, the second plane mirror 3 and the first plane mirror 2, the first transmitted beam enters the fixed fourth prism 6 and the third prism 5, and then returning to the semi-transparent semi-reflective beam splitter 1, and then is divided into a second transmitted beam exiting in the second direction and a second reflected beam exiting in the first direction. The first reflected beam enters the first prism 7 after passing through the first plane mirror 2, and then reaches the second plane mirror 3 and the third plane mirror 4, and then enters the second prism 8, and then returns to the semi-transparent semi-reflective beam splitter 1, and then is divided into a third transmitted beam emitted in the first direction and a third reflected beam emitted in the second direction. The second transmitted beam interferes with the third reflected beam to form a second exit interference signal and is imaged by the second convergence module 16 onto the detector image surface of the second detection acquisition module 18, and the interference signal is collected, amplified, noise reduction, etc. and then enters the signal processing module 19 for further processing and inversion, and the spectral (imaging) diagram of the incident beam 9 is obtained; At the same time, the second reflected beam and the third transmitted beam interfere to form a first exit interference signal and being reflected by the mirror 13, and is imaged by the first convergence module 15 onto the detector cell of the first detection acquisition module 17, and the interference signal is collected, amplified, noise reduction, etc. and preprocessed into the signal processing module 19 for further processing and inversion, and another spectral (imaging) picture of the incident beam 9 is obtained. After passing through the first detection acquisition module 17 and the second detection acquisition module 18, respectively, and processed by the signal processing module 19, the two spectral maps are superimposed to obtain a spectral image of a target with a higher signal-to-noise ratio.

Wherein the pre-module 12 includes a converging lens 1201, an optical stop 1202 and a collimating lens 1203 disposed sequentially along the optical path. The incident beam 9 is converging by the converging lens 1201, the optical stop 1202 filters and limits the shape of image surface of the converging lens 1201, and prevents stray light, and then collimated by the collimating lens 1203 so that the light passing through the pre-module 12 becomes a parallel light. Further, the pre-module 12 may take various forms such as refraction, refraction and total reflection, and the purpose of which is to transform the target radiation into a parallel ray. According to the design needs, the pre-module 12 may also remove the collimating lens 1203 to become a converging optical path, or the pre-module 12 is directly omitted according to the design needs.

The function of the first converging module 15 and the second converging module 16 is to aggregate and image the interference fringes formed by the interferometer onto the detector cells of the first detection acquisition module 17 and the second detection acquisition module 18, respectively. The first converging module 15 and the second converging module 16 may be separate lenses or lens combinations, respectively, and the lens combination facilitates the elimination of aberrations. The converging mirror (group) can be refractive or reflective, and converging the interference beam onto the detector image surface is the main purpose.

The function of the first detection acquisition module 17 and the second detection acquisition module 18 is to sample and collect the interference fringe signal at different moments, and convert it into an electrical signal, and the signal is amplified, filtered, etc., to provide original measurement data for the inversion of the spectrum, image and other related parameters of the target light. Depending on the detection light source, the detection acquisition module can be CCD or other photoelectric conversion devices.

The signal processing system 19 is configured for data processing and analysis of the interference signal obtained by the first detection acquisition module 17 and the second detection acquisition module 18, including preprocessing of the original data of the interferogram, error correction, spectral responsivity calibration correction, radiometric calibration correction, and Fourier transform, etc., to complete the spectral restoration process, obtain the spectrum of the target, or high-resolution spectral image.

The spectral application range of the present invention is applicable from ultraviolet to far infrared, THz, mainly limited by the spectral application range of beam splitter, prism, mirror coating, that is, in different wavelengths corresponding to different beam splitter substrate materials and their coatings, prism materials and their film and mirror coatings.

Further, based on the principles of the present invention may be derived other forms of spectrometer/spectrometer (imager). Some of these devices can be added or subtracted, such as eliminating the front components to reduce the volume and weight of the instrument. By adding polarization devices to the optical path, a time-modulated polarization spectrometer and a polarization spectrometer (imager) can be formed.

Example 2

Example 2 provides a quadrilateral common-path time-modulated interferometric spectral imaging method, using a quadrilateral common-path time-modulated interferometric spectral imaging device provided in Example 1 to achieve, by providing a moving mirror scanning mechanism for generating time-varying optical path differences in the quadrilateral common-path interferometer, so that the quadrilateral common-path time-modulated interferometric spectral imaging device works in staring observation mode.

A specific method corresponding to an apparatus of Example 1 is provided below.

A quadrilateral common-path time-modulated interferometric spectral imaging method including the following steps:

Step 1: The target light becomes a parallel light after passing through the pre-module and is incident to the quadrilateral common-path interferometer;

Step 2: The parallel light is divided into a first transmitted beam and a first reflected beam by a semi-transparent semi-reflective beam splitter. The first transmitted beam returns to the semi-translucent semi-reflective beam splitter again after passing through the first plane mirror, the second plane mirror, the third plane mirror and the first optical path adjustment module, and is divided into a second transmitted beam and a second reflected beam by the semi-transparent semi-reflective beam splitter; The first reflected beam returns to the semi-transparent semi-reflective beam splitter again after passing through the first plane mirror, the second plane mirror, the third plane mirror, and the second optical path adjustment module, and is divided into a third transmitted beam and a third reflected beam by the semi-transparent semi-reflective beam splitter; The second reflected beam and the third transmitted beam are emitted in the first direction, and the second transmitted beam and the third reflected beam are emitted in the second direction.

Step 3: The beam exited by the quadrilateral common-path interferometer is formed into interference through the convergence module, and imaged to the detection and acquisition module.

Step 4: Through the detection acquisition module to sample and collect interference fringe signals at different moments, and convert into electrical signals to obtain detection information.

Step 5: Spectral restoration is carried out according to the detection information through the signal processing module to obtain spectral information.

An embodiment of the present invention provides a quadrilateral common-path time-modulated interferometric spectral imaging device and method including at least the following technical effects:

(1) The working mode of time-modulated common-path interferometric spectroscopy (imaging) instrument can be realized. In traditional common-path interferometer, because the optical path of the two arms of the interferometer is always fixed or the same, resulting in the optical path difference between the two arms is fixed, so that the time-modulated working mode cannot be realized. However, the present invention can produce different optical path differences through the motion of the moving mirror in the common-path interferometer at different moments, and then a time-integral interferogram can be obtained, thereby reflecting the spectral information of the target. The working mode of the present invention breaks through the previous limitation ability of common-path interferometers on spectral information acquisition.

(2) The core components of the common-path interferometer can be used. The traditional time-modulated interferometric spectroscopy (imaging) instrument obtains interferograms at different times due to the changing optical path difference, and the two arms of its core interferometer components are relatively independent, that is, the interferometer of the non-common-path. Non-common-path and common-path interferometers are different types of interferometers. The present invention breaks through the limitations of traditional non-common-path interferometer, and realizes time-modulated interferometric spectroscopy (imaging) technology based on common-path interferometer.

(3) High stability. The interference spectroscopic technology used in the present invention is based on common-path technology, and the common-path type interferometric spectroscopy (imaging) instrument has high stability. The interferometer of non-common-path technology used in the traditional time-modulated interferometric spectroscopy (imaging) instrument is easily interfered by external thermodynamic changes, resulting in changes in optical path difference, which in turn causes the movement of interference fringes and phase instability, which will bring large instrument errors and make high-precision measurements inaccurate. After using the common-path spectroscopic technology, the external thermodynamic changes act on the two arms of the interferometer at the same time, so the optical path difference generated can cancel each other, the interference fringes formed are more stable, and the corresponding interferometer and spectroscopic (imaging) instrument have high stability.

(4) Wide application. Due to the use of common-path spectroscopy, the stability of the time-modulated interferometer is greatly improved, and the anti-interference ability is enhanced, so that vehicle-mounted motion platforms, airborne, shipborne, mobile robots, spaceborne and other motion platforms that the tradition one basically unable to apply can also be used, therefore, there are more applications and wider application fields.

(5) Simple structure and easy to miniaturize. The core interferometer of the common-path type time-modulated interferometric spectroscopic scheme proposed by the present invention can be composed only of a beam splitter, a plane mirror and a prism, removing the beam splitter compensation piece in the traditional time-modulated interferometric spectrometer (imaging) instrument, so the whole structure is very compact, and is still convenient for miniaturization, suitable for handheld without losing luminous flux, and is easy to carry on various platforms.

(6) The variation sampling of the optical path difference from −L to +L can be realized (L is the maximum optical path difference). The optical path difference between the two arms of the traditional common-path interferometer is fixed. The present invention is provided with a light path adjustment device in both arms of the interferometer, and the attitude of the optical path adjustment device in the moving arm can be rotated and changed, so that the optical path difference change from −L to 0 and then from 0 to +L can be realized, and the position of the zero optical path difference is passed, so that the interferometer can obtain the corresponding change of the interferogram, this process is a prerequisite for achieving the spectral recovery of the target and realizing the time-modulated interferometric spectrometer (imager).

(7) It can realize the self-compensation of the shaking error of the rotating axis of the moving mirror, and realize the permanent collimation of the interferometer. By strictly controlling the design and processing technology of the optical path adjustment device, the incident surface of the beam through the optical path adjustment device is strictly parallel to the exit surface, so that even if the optical path adjustment device is tilted in a certain attitude due to the shaking of the rotation axis, the exit beam still remains parallel to the incident beam, and the propagation direction of the beam is not deflected; That is, this scheme can realize the self-compensation of attitude error caused by shaft shaking when the moving mirror rotates, so as to realize the immunity of interferometer shaking error and the permanent collimation of two interferometric lights.

(8) A high interference modulation depth can be realized. Set a pair of optical path adjustment devices with consistent attitude in the moving arm of the interferometer, and ensure that the beam incidence surface of each optical path adjustment device is strictly parallel to the exit surface, then according to the principle of reversible optical path, the beam incident to the previous optical path adjustment device, even if the spatial position shift occurs due to the attitude change of the optical path adjustment device, it will be compensated by the latter optical path adjustment device, so that the beam not only remains consistent with the ideal propagation direction when there is no attitude change. Moreover, the spatial position when returning to the beam splitter is also consistent with the ideal spatial position when there is no attitude change, so that the interference beam completely coincides spatially, thereby avoiding the image plane interference problem caused by the non-overlapping of the beam in space (the interference modulation depth decreases due to the existence of the converging mirror group error), so a high interferometric modulation depth can be achieved.

(9) Suitable for high-speed measurement. Since the prism that produces the optical path difference adopts the 360° continuous rotation method, the acceleration and deceleration process in the traditional linear or swinging process is avoided during the measurement process, and the time utilization rate is improved, so the measurement frequency is improved. At the same time, the prism material that produces the optical path difference can produce more than 8 zero-crossing points in a 360° cycle, that is, more than 8 interferograms and spectra can be generated by the rotation of the prism in one rotation, thus making ultra-high-speed spectral measurement possible. The realization of this function will not only improve the anti-environmental interference ability of the interferometric spectrometer (imager), but also enable the interferometric spectrometer (imager) to be further extended to the field of high-speed spectral measurement, such as flying targets, flames or even chemical reactions.

(10) High energy utilization rate and high system sensitivity. In the present invention, the interferometer adopts an asymmetric design, so that the two interferometric lights output by the interferometer can be fully utilized, avoiding the situation that only one interference output is used in the traditional spectroscopy/imager, so that the utilization rate increases to nearly 100%, and the transmittance of the whole system is also greatly increased, thereby improving the sensitivity of the system.

Finally, it should be noted that the above embodiments are only used to illustrate the technical solution of the present invention and not to limitations, although the present invention is described in detail with reference to examples, those of ordinary skill in the art should understand that the technical solution of the present invention may be modified or replaced equivalently, without departing from the spirit and scope of the technical solution of the present invention, which should be covered in the scope of the claims of the present invention.

What is claimed is:

1. A quadrilateral common-path time-modulated interferometric spectral imaging device comprising a quadrilateral common-path interferometer, the quadrilateral common-path interferometer has an asymmetric structure, and the quadrilateral common-path interferometer is provided with a moving mirror scanning mechanism for generating time-varying optical path difference, and the quadrilateral common-path time-modulated interferometric spectral imaging device works in a staring observation mode;

the quadrilateral common-path interferometer comprises a first optical path adjustment module and a second optical path adjustment module; the first optical path adjustment module and the second optical path adjustment module are combined to constitute the moving mirror scanning mechanism, the first optical path adjustment module and the second optical path adjustment module are placed in two arms of the interferometer, and the two arms respectively produce a first optical path and a second optical path, a combination of the first optical path and the second optical path forms optical path difference changes from −L to 0 and then from 0 to +L, where L is a maximum optical path difference, wherein the quadrilateral common-path interferometer further comprises a semi-transparent semi-reflective beam splitter, a first planar mirror, a second planar mirror, and a third planar mirror;

a target light is incident to the quadrilateral common-path interferometer, which is divided into a first transmitted beam and a first reflected beam after passing through the semi-transparent semi-reflective beam splitter; the first transmitted beam returns to the semi-translucent semi-reflective beam splitter again after reflecting from the first plane mirror, the second plane mirror, and the third plane mirror and passing through the first optical path adjustment module, and is divided into a second transmitted beam and a second reflected beam by the semi-transparent semi-reflective beam splitter; the first reflected beam returns to the semi-transparent semi-reflective beam splitter again after reflecting from the first plane mirror, the second plane mirror, and the third plane mirror, and passing through the second optical path adjustment module, and is divided into a third transmitted beam and a third reflected beam by the semi-transparent semi-reflective beam splitter; the second reflected beam and the third transmitted beam exit in a first direction, and the second transmitted beam and the third reflected beam exit in a second direction, wherein the first transmitted beam and the first reflected beam are incident on the first planar mirror at different positions, and the first transmitted beam and the first reflected beam are incident on the second planar mirror at different positions.

2. The quadrilateral common-path time-modulated interferometric spectral imaging device according to claim 1, wherein one of the first optical path adjustment module and the second optical path adjustment module is a moving mirror, and the other optical path adjustment module is a fixed mirror; the optical path adjustment module as the moving mirror includes an optical path adjustment device and a motor, the optical path adjustment module moves under the drive of the motor; the path adjustment module as the fixed mirror includes only an optical path adjustment device.

3. The quadrilateral common-path time-modulated interferometric spectral imaging device according to claim 2, wherein the optical path adjustment device in the optical path adjustment module as a moving mirror comprises a first prism and a second prism, and the optical path adjustment device in the optical path adjustment module as the fixed mirror comprises a third prism and a fourth prism; an exit surface after a beam passing through any one of the first prism, the second prism, the third prism, and the fourth prism is parallel to an incident surface; the first prism and the second prism rotate under the drive of the motor, and a rotation axis of the motor is perpendicular to a propagation direction of the beam; attitudes of the third prism and the fourth prism have angles tilt relative to a perpendicular incident surface of the beam, which is used to compensate for an zero dispersion effect and increase an zero-crossing optical path difference position.

4. The quadrilateral common-path time-modulated interferometric spectral imaging device according to claim 1, wherein the first optical path adjustment module and the second optical path adjustment module are moving mirrors, the first optical path adjustment module comprises a first optical path adjustment device and a first motor, and the second optical path adjustment module comprises a second optical path adjustment device and a second motor; the first optical path adjustment device moves under the drive of the first motor, and the second optical path adjustment device moves under the drive of the second motor.

5. The quadrilateral common-path time-modulated interferometric spectral imaging device according to claim 4, wherein a motion mode of the moving mirror is one of a rotation, a swing, and a linear motion.

6. The quadrilateral common-path time-modulated interferometric spectral imaging device according to claim 1, further comprises: a convergence module, a detection acquisition module and a signal processing module; a target surface of the detection acquisition module is located on a back focal plane of the convergence module, and the signal processing module is connected with the detection acquisition module; the convergence module is configured to form interference from the beam exited by the quadrilateral common-path interferometer, and image it onto the detection acquisition module; the detection acquisition module is configured to sample and collect an interference fringe signal at different moments, and convert it into an electrical signal to obtain detection information; the signal processing module is configured for spectral restoration according to the detection information to obtain a spectral information.

7. The quadrilateral common-path time-modulated interferometric spectral imaging device according to claim 1, further comprises: a pre-module; the pre-module comprises a converging lens, an aperture and a collimating lens disposed sequentially along an optical path; the target light passes through the pre-module and becomes a parallel light and is incident to the quadrilateral common-path interferometer.

8. A quadrilateral common-path time-modulated interferometric spectral imaging method, wherein the quadrilateral common-path time-modulated interferometric spectral imaging device is used to achieve the quadrilateral common-path time-modulated interferometric spectral imaging device according to claim 1, by setting the moving mirror scanning mechanism for generating the time-varying optical path difference in the quadrilateral common-path interferometer, so that the quadrilateral common-path time-modulated interferometric spectral imaging device works in the staring observation mode.

9. The quadrilateral common-path Fourier Transform spectroscopy imaging method according to claim 8, comprises the following steps:

Step 1: a target light becomes a parallel light after passing through a pre-module and is incident to the quadrilateral common-path interferometer;

Step 2: the parallel light is divided into a first transmitted beam and a first reflected beam by a semi-transparent semi-reflective beam splitter; the first transmitted beam returns to the semi-transparent semi-reflective beam splitter again after reflecting from a first plane mirror, a second plane mirror, and a third plane mirror and passing through the first optical path adjustment module, and is divided into a second transmitted beam and a second reflected beam by the semi-transparent semi-reflective beam splitter; the first reflected beam reflects from the first plane mirror, the second plane mirror, and the third plane mirror and passes through the second optical path adjustment module and returns again to the semi-translucent semi-reflective beam splitter, and is divided into a third transmitted beam and a third reflected beam by the semi-transparent semi-reflective beam splitter; the second reflected beam and the third transmitted beam are emitted in a first direction, and the second transmitted beam and the third reflected beam are emitted in a second direction;

Step 3: the beam exited by the quadrilateral common-path interferometer is formed into interference through a convergence module, and imaged to a detection acquisition module;

Step 4: through the detection acquisition module to sample and collect interference fringe signals at different moments, and convert into electrical signals to obtain a detection information;

Step 5: a spectral restoration is carried out according to the detection information through a signal processing module to obtain a spectral information.

* * * * *